(No Model.)

G. W. SPIDEL.
GATE.

No. 481,876. Patented Aug. 30, 1892.

Witnesses
Chas. A. Ford.
N. F. Riley

Inventor
George W. Spidel.

By his Attorneys,
C. A. Snow & Co.

UNITED STATES PATENT OFFICE.

GEORGE W. SPIDEL, OF BAKER'S CORNERS, INDIANA, ASSIGNOR OF ONE-HALF TO H. L. COVODE, OF SAME PLACE.

GATE.

SPECIFICATION forming part of Letters Patent No. 481,876, dated August 30, 1892.

Application filed February 9, 1892. Serial No. 420,914. (No model.)

*To all whom it may concern:*

Be it known that I, GEORGE W. SPIDEL, a citizen of the United States, residing at Baker's Corners, in the county of Hamilton and State of Indiana, have invented a new and useful Gate, of which the following is a specification.

The invention relates to improvements in gates.

The object of the present invention is to simplify and improve the construction of swinging gates and to provide one which will when opened be raised so as to pass over snow and the like and so that it will close automatically.

The invention consists in the construction and novel combination and arrangement of parts hereinafter fully described, illustrated in the accompanying drawings, and pointed out in the claim hereto appended.

Figure 1:
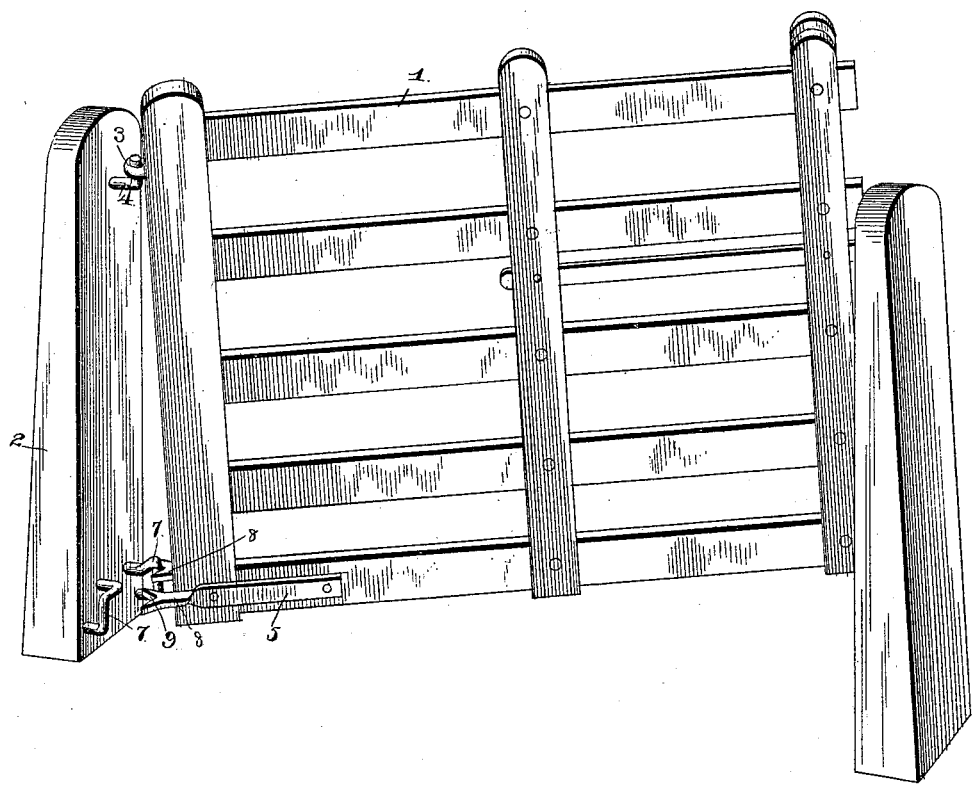
Figure 2:
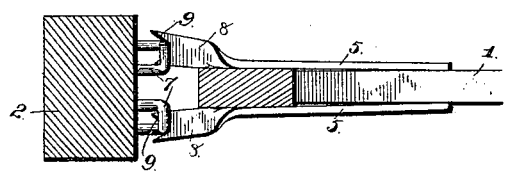
Figure 4:
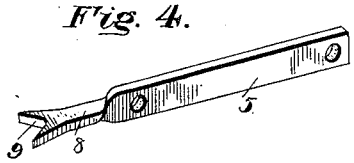
Figure 3:

In the drawings, Figure 1 is a perspective view of a gate constructed in accordance with this invention, the gate being partially open. Fig. 2 is a horizontal sectional view of a portion of the gate. Fig. 3 is a detail perspective view of one of the pintle-loops. Fig. 4 is a detail perspective view of one of the bars of the lower hinge.

Like numerals of reference indicate corresponding parts in all the figures of the drawings.

1 designates a swinging gate hinged to a post 2 at the top by an eyebolt 3 and a pintle 4 and hinged at the bottom by bars 5, secured at opposite sides of the gate and projecting rearwardly therefrom, and pintle loops or staples 7, secured a suitable distance apart to the hinged post 2 and arranged to be engaged by the bars 5. The bars 5 are twisted near their rear ends 8, which are flattened and horizontally disposed, diverge slightly, and are provided with V-shaped notches 9. The pintle loops or staples are situated slightly to either side of the gate when the latter is in its closed position and are vertically disposed and slightly curved laterally. They are adapted to be readily driven into a post to project therefrom to throw the lower end of the gate outward and upward. The lateral bending or bulging of the pintle-loops forms horizontal stops to prevent the gate being accidentally lifted and disengaged from its upper pintle 4. When the gate is open, the bar 5 at the side on which the gate is opened engages its pintle-loop, and as the gate is opened the front end of the same is raised by reason of the lower rear end of the gate being thrown outward from the post by the bar and the pintle-loop. This raising of the gate in opening enables it to pass over the snow and to close automatically by its own weight.

It will be seen that the gate is simple and inexpensive in construction and that the improvements may be readily applied to gates of the ordinary construction and that a gate provided with the improvements may be readily lifted from and placed on its hinges.

What I claim is—

The combination, with a gate and a hinge-post, of a hinge connecting the upper portion of the gate to the hinge-post, the pintle-loops arranged a suitable distance apart near the lower end of the hinge-post and bent laterally to form upper horizontal stops, and the bars secured at opposite sides of the gate and extending rearward therefrom and having their rear ends provided with recesses and arranged to engage the pintle-loops, substantially as described.

In testimony that I claim the foregoing as my own I have hereto affixed my signature in the presence of two witnesses.

GEORGE W. SPIDEL.

Witnesses:
ERNEST FRISTOE,
WINT FIFER.